(12) United States Patent
Shiragur et al.

(10) Patent No.: US 11,829,940 B2
(45) Date of Patent: *Nov. 28, 2023

(54) ITEM TRANSFER CONTROL SYSTEMS

(71) Applicant: Adobe Inc., San Jose, CA (US)

(72) Inventors: Kirankumar Shiragur, Vijayapur (IN); Tung Thanh Mai, San Jose, CA (US); Anup Bandigadi Rao, San Jose, CA (US); Ryan A. Rossi, San Jose, CA (US); Georgios Theocharous, San Jose, CA (US); Michele Saad, Austin, TX (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,586

(22) Filed: Mar. 6, 2023

(65) Prior Publication Data

US 2023/0206171 A1 Jun. 29, 2023

Related U.S. Application Data

(63) Continuation of application No. 17/394,707, filed on Aug. 5, 2021, now Pat. No. 11,636,423.

(51) Int. Cl.
*G06Q 10/0835* (2023.01)
*G06Q 10/087* (2023.01)
(Continued)

(52) U.S. Cl.
CPC ....... *G06Q 10/08355* (2013.01); *G06F 17/11* (2013.01); *G06Q 10/047* (2013.01); *G06Q 10/087* (2013.01)

(58) Field of Classification Search
CPC .......... G06Q 10/08355; G06Q 10/047; G06Q 10/087; G06F 17/11
(Continued)

(56) References Cited

U.S. PATENT DOCUMENTS 11,636,423 B2 4/2023 Shiragur et al.
2014/0100992 A1* 4/2014 Shi .................. G06Q 30/0635
705/26.81

(Continued)

OTHER PUBLICATIONS

"Inventory Optimization Techniques, System vs. Item Level Inventory Analysis" Published by IEEE (Year: 2004).*

(Continued)

*Primary Examiner* — Zeina Elchanti
(74) *Attorney, Agent, or Firm* — FIG. 1 Patents

(57) ABSTRACT

In implementations of item transfer control systems, a computing device implements a transfer system to receive input data describing types of requested items and corresponding quantities of the types of requested items to receive at each of a plurality of destination sites and types of available items and corresponding quantities of the types of available items that are available at each of a plurality of source sites. The transfer system constructs a flow network having a source node for each of the plurality of the source sites and a destination node for each of the plurality of the destination sites. An integral approximate solution is generated that transfers the corresponding quantities of the types of requested items to each of the plurality of the destination sites using a maximum flow solver and the flow network. The transfer system causes transferences of the corresponding quantities of the types of requested items to each of the plurality of the destination sites based on the integral approximate solution.

20 Claims, 10 Drawing Sheets

(51) Int. Cl.
  *G06Q 10/047* (2023.01)
  *G06F 17/11* (2006.01)
(58) Field of Classification Search
  USPC .......................................................... 705/338
  See application file for complete search history.

(56) References Cited

U.S. PATENT DOCUMENTS

2020/0320467 A1\* 10/2020 Wu ....................... G06Q 10/087
2023/0041594 A1   2/2023 Shiragur et al.

OTHER PUBLICATIONS

"Ellipsoid method", Wikipedia, The Free Encyclopedia [retrieved Jul. 9, 2021]. Retrieved from the Internet <https://en.wikipedia.org/wiki/Ellipsoid_method>., 6 pages.

U.S. Appl. No. 17/394,707, "Non-Final Office Action", U.S. Appl. No. 17/394,707, filed Aug. 29, 2022, 7 pages.

U.S. Appl. No. 17/394,707, "Notice of Allowance", U.S. Appl. No. 17/394,707, filed Jan. 27, 2023, 8 pages.

Adams, C.M., et al., "Inventory optimization techniques, system vs. item level inventory analysis", Annual Symposium Reliability and Maintainability, 2004—RAMS [retrieved Jan. 27, 2023]. Retrieved from the Internet <https://doi.org/10.1109/RAMS.2004.1285423>, Jan. 2004, 6 pages.

Alon, Noga, et al., "Algorithmic construction of sets for k-restrictions", ACM Transactions on Algorithms, vol. 2, No. 2 [retrieved Jun. 23, 2021]. Retrieved from the Internet <http://www.math.tau.ac.il/~nogaa/PDFS/GPGames.pdf>., Apr. 1, 2006, 25 Pages.

Alon, Noga, et al., "The online set cover problem", STOC '03: Proceedings of the thirty-fifth annual ACM symposium on Theory of computing [retrieved Jun. 23, 2021]. Retrieved from the internet <https://www.tau.ac.il/~nogaa/PDFS/aaabnproc2.pdf>., Jun. 9, 2003, 6 Pages.

Azar, Yossi, et al., "Set Cover with Delay—Clairvoyance Is Not Required", 28th Annual European Symposium on Algorithms (ESA 2020) [retrieved Jun. 23, 2021]. Retrieved from the Internet <https://drops.dagstuhl.de/opus/volltexte/2020/12874/pdf/LIPIcs-ESA-2020-8.pdf>., Aug. 26, 2020, 21 Pages.

Azar, Yossi, et al., "The min-cost matching with concave delays problem", SODA '21: Proceedings of the Thirty-Second Annual ACM-SIAM Symposium on Discrete Algorithms [retrieved Jun. 23, 2021]. Retrieved from the Internet <https://arxiv.org/pdf/2011.02017.pdf>., Jan. 10, 2021, 40 Pages.

Cormode, Graham, et al., "Set cover algorithms for very large datasets", CIKM '10: Proceedings of the 19th ACM International conference on Information and knowledge management [retrieved Jun. 23, 2021]. Retrieved from the Internet <http://archive.dimacs.rutgers.edu/~graham/pubs/papers/ckw.pdf>., Oct. 26, 2010, 10 Pages.

Dinur, Irit, et al., "Analytical approach to parallel repetition", STOC '14: Proceedings of the forty-sixth annual ACM symposium on Theory of computing [retrieved Jun. 23, 2021]. Retrieved from the Internet <http://www.bayesianestimation.org/paper/productgames.pdf>., May 31, 2014, 30 Pages.

Emek, Yuval, et al., "Online matching: haste makes waste!", STOC '16: Proceedings of the forty-eighth annual ACM symposium on Theory of Computing [retrieved Jun. 23, 2021]. Retrieved from the Internet <https://tik-db.ee.ethz.ch/file/399a625c3543adf1e50063be3a8bbf5d/omhw.pdf>., Jun. 19, 2016, 32 Pages.

Feige, Uriel, et al., "A threshold of ln n for approximating set cover", Journal of the ACM, vol. 45, No. 4 [retrieved Jun. 24, 2021]. Retrieved from the Internet <http://citeseerx.ist.psu.edu/viewdoc/download?doi=10.1.1.35.8576&rep=rep1&type=pdf>., Jul. 1, 1998, 23 Pages.

Hassin, Refael, et al., "A Better-Than-Greedy Approximation Algorithm for the Minimum Set Cover Problem", SIAM Journal on Computing, vol. 35, No. 1 [retrieved Jun. 24, 2021]. Retrieved from the Internet <http://citeseerx.ist.psu.edu/viewdoc/download?doi=10.1.1.96.1615&rep=rep1&type=pdf>., Jul. 1, 2005, 17 Pages.

Jasin, Stefanus, et al., "An LP-Based Correlated Rounding Scheme for Multi-Item Ecommerce Order Fulfillment", Operations Research, vol. 63, No. 6 [online][retrieved May 5, 2021]. Retrieved from the Internet <https://www.researchgate.net/profile/Stefanus-, Dec. 2015, 49 pages.

Karp, Richard M, "Reducibility among Combinatorial Problems", Complexity of Computer Computations. The IBM Research Symposia Series. Springer, Boston, MA [online][retrieved May 6, 2021]. Retrieved from the Internet <https://citeseerx.ist.psu.edu/viewdoc/download?doi=10.1.1.464.2754&rep=rep1&type=pdf#page=232>., 1972, 23 pages.

Khachiyan, Leonid G, "A Polynomial-Time Algorithm for Solving Linear Programs", Dokl. AN SSSR, vol. 244, No. 5 [retrieved Jul. 9, 2021]. Retrieved from the Internet <http://www.mathnet.ru/php/archive.phtml?wshow=paper&jrnid=dan&paperid=42319&option_lang=rus>., 1979, 5 pages.

Kleinberg, Jon, et al., "Algorithm Design", Addison-Wesley Longman Publishing Co., Inc., USA [retrieved Jun. 24, 2021]. Retrieved from the Internet <https://www.cs.sjtu.edu.cn/~jiangli/teaching/CS222/files/materials/Algorithm%20Design.pdf>., Mar. 2005, 864 Pages.

Kolliopoulos, Stavros G., et al., "Approximation algorithms for covering/packing integer programs", Journal of Computer and System Sciences, vol. 7, No. 4 [retrieved Jun. 24, 2021]. Retrieved from the Internet <https://core.ac.uk/download/pdf/82645682.pdf>., Nov. 1, 2005, 11 Pages.

Mitzenmacher, Michael, et al., "Probability and Computing Randomization and Probabilistic Techniques in Algorithms and Data Analysis", Cambridge University Press, India [retrieved Jun. 24, 2021]. Retrieved from the Internet <https://www.cs.purdue.edu/homes/spa/courses/uj16/mu-book.pdf>., 2005, 366 pages.

Raghavan, Prabhakar, et al., "Randomized rounding: a technique for provably good algorithms and algorithmic proofs", Combinatorica, vol. 7, No. 4 [retrieved Jun. 24, 2021]. Retrieved from the Internet <http://www.columbia.edu/~cs2035/courses/ieor6614.S11/rr.pdf>., 12/01/987, 15 Pages.

Slavík, Petr, et al., "A tight analysis of the greedy algorithm for set cover", STOC '96: Proceedings of the twenty-eighth annual ACM symposium on Theory of Computing [retrieved Jun. 24, 2021]. Retrieved from the Internet <http://citeseerx.ist.psu.edu/viewdoc/download?doi=10.1.1.38.4146&rep=rep1&type=pdf>., Jul. 1, 1996, 13 Pages.

Vazirani, Vijay V, "Approximation algorithms", Springer-Verlag Berlin Heidelberg [retrieved Jun. 24, 2021]. Retrieved from the Internet <https://labs.xjtudlc.com/labs/wldmt1/books/Algorithms%20and%20optimization/Approximation%20Algorithms.pdf>., Aug. 2001, 401 Pages.

Xu, Ping Josephine, et al., "Benefits of Reevaluating Real-Time Order Fulfillment Decisions", Manufacturing & Service Operations Management, vol. 11, No. 2 [retrieved May 19, 2021]. Retrieved from the Internet <https://doi.org/10.1287/msom.1080.0222>., Dec. 4, 2008, 16 pages.

Zhang, Yuankai, et al., "Multi-warehouse package consolidation for split orders in online retailing", European Journal of Operational Research, vol. 289, No. 3 [retrieved May 19, 2021]. Retrieved from the Internet <https://doi.org/10.1016/j.ejor.2019.07.004>., Mar. 16, 2021, 16 pages.

\* cited by examiner

ITEM TRANSFER CONTROL SYSTEMS

RELATED APPLICATIONS

This application is a continuation of and claims priority to U.S. patent application Ser. No. 17/394,707, filed Aug. 5, 2021, entitled "Item Transfer Control Systems," the entire disclosure of which is hereby incorporated by reference herein in its entirety.

BACKGROUND

One of the challenges faced by computing devices involves computational tasks that cannot be completed using a processing system of a computing device in "polynomial time." Computational tasks are completable in polynomial time if a number of computations involved in completing the tasks is bounded by a polynomial function of a number of inputs involved in the computational tasks. If a computational task is not completable in polynomial time, then for each input to the task, a number of computations utilized to complete the task increases exponentially. As such, any increase in a number of inputs rapidly consumes computational resources of the computing devices. Consequently, in some instances it is not possible to perform these computational tasks, practically, by available computing device resources.

An example of such a challenge that is not possible in polynomial time involves computing an accurate solution by computing devices to transfer particular items from multiple different source sites to multiple different destination sites. This has been observed in practical applications and it has also been proven theoretically that the number of computations involved in computing the accurate solution increases exponentially as a number of the items is increased. In practice, this eventually overwhelms any available computational resources especially when confronted with the millions of items transferred daily by existing service provider systems that implement digital services to control these transfers.

SUMMARY

Techniques and systems are described to improve operation of computing devices that implement a transfer system in order to calculate solutions for transferring items between physical locations. In an example, a computing device implements the transfer system to receive input data. The input data describes types of requested items and corresponding quantities of the types of requested items to be transferred to each of a plurality of destination sites. The input data also describes types of available items and corresponding quantities of the types of available items that are available at each of a plurality of source sites.

In order to overcome the challenges of conventional techniques such that this computation is possible by available computational resources even when confronted by a multitude of items, the transfer system generates a fractional solution. The fractional solution transfers corresponding quantities of the types of requested items to each of the plurality of the destination sites from the corresponding quantities of the types of available items that are available at a first subset of the plurality of the source sites. The fractional solution, while accurate, transfers fractions of the items to at least some destination sites included in the plurality of the destination sites. Accordingly, the fractional solution is not feasible because fractions of the items are not transferable.

To overcome this limitation, the transfer system generates an approximate fractional solution based on the fractional solution. The approximate fractional solution transfers the corresponding quantities of the types of requested items from a second subset of the plurality of the source sites in quantities that are limited by a threshold amount. The transfer system identifies non-zero transfers of the approximate fractional solution and rounds these identified transfers to integral transfers. The rounded integral transfers are usable to avoid numerous computations such that an integral approximate solution is possible to compute in polynomial time.

To do so in one example, the transfer system constructs a flow network, automatically and without user intervention, having a source node for each of the plurality of the source sites and a destination node for each of the plurality of the destination sites. Nodes of the flow network are connected by directed edges based on the rounded integral transfers obtained from the approximate fractional solution above. For example, the transfer system generates the integral approximate solution that transfers the corresponding quantities of the types of requested items to each of the plurality of the destination sites using a maximum flow solver and the flow network. The integral approximate solution accurately transfers integral quantities of the types of requested items from the plurality of source sites and is also computable in polynomial time and as such overcomes the challenges of conventional techniques to provide a practical solution to item transfer computations.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
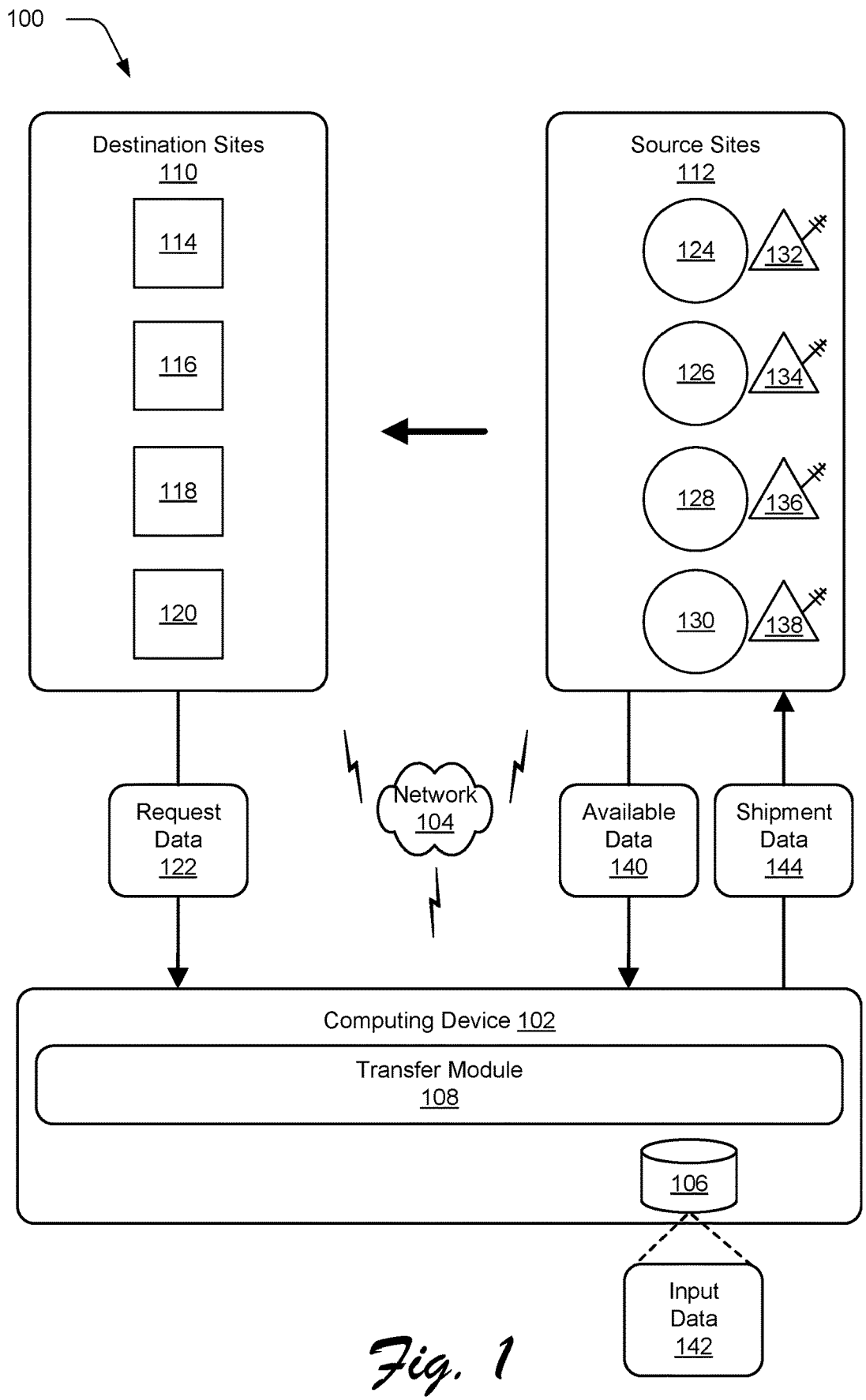
FIG. 1 is an illustration of an environment in an example implementation that is operable to employ digital systems and techniques for item transfer control systems as described herein.

A significant challenge for computing devices involves computational tasks that cannot be completed by processing systems of the computing devices in "polynomial time." This is because a number of computations utilized to complete such computational tasks is not bounded by a polynomial function of a number of inputs involved in the computational tasks. Rather, if a computational task is not completable in polynomial time, then for each input to the task, a number of computations involved in completing the task increases exponentially. As a result, any increases in a number of inputs for the computational task quickly consumes available computational resources of the computing devices. Eventually, the computational task becomes impossible to perform by the available computational resources of the computing devices, even for large service platforms implemented by a multitude of computing devices, e.g., a server farm.

One such practical application of a computational task that is not possible to complete in polynomial time by processing systems of computing devices involves computing an accurate solution, by the computing devices, to transfer particular items from multiple different source sites to multiple different destination sites. It has been shown theoretically that a number of computations involved in completing the accurate solution increases exponentially as a number of the particular items is increased linearly. It has also been observed in real world practical applications that a relatively small increase in the number of the particular items overwhelms available computational resources of the computing devices. In practice, this makes the accurate solution impossible to compute even for transferring a number of items that is substantially smaller than the numbers of items transferred every day (e.g., millions of items) by existing service provider systems.

Systems and techniques are described to improve operation of computing devices that implement a transfer system for computing solutions to transfer items between physical locations. In one example, a computing device implements the transfer system to receive input data describing types of requested items and corresponding quantities of the types of requested items to be transferred to each of a plurality of destination sites. The input data also describes types of available items and corresponding quantities of the types of available items that are available at each of a plurality of source sites.

In order to overcome the limitations of conventional techniques such that it is possible to compute an accurate solution for transferring large numbers of the items by computational resources that are available to even large service provider systems, the transfer system generates a fractional solution. The fractional solution transfers corresponding quantities of the types of requested items to each of the plurality of the destination sites from the corresponding quantities of the types of available items that are available at a first subset of the plurality of the source sites. Although this fractional solution is accurate, it also transfers fractions of items to some of the destination sites included in the plurality of the destination sites. Thus, the fractional solution is not usable in real world applications because the items cannot be transferred in fractions. For example, the items are components of products, medical devices, complete products, and so forth.

To overcome this, the transfer system generates an approximate fractional solution based on the fractional solution. To do so in one example, the transfer system generates the approximate fractional solution by sampling a distribution of the fractional solution and aggregating the samples. The approximate fractional solution transfers the corresponding quantities of the types of requested items from a second subset of the plurality of the source sites in quantities that are limited by a threshold amount.

Unlike conventional techniques that do no limit quantities of items transferred from source sites which is inefficient, the described systems sample the distribution of the fractional solution conditionally and iteratively based on the threshold amount. For example, the transfer system first samples the distribution of the fractional solution based on the threshold amount and then resamples the distribution of the fractional solution based on an outcome of the first sample. By conditionally sampling the fractional solution and aggregating the samples in this manner, the transfer system generates the approximate fractional solution which does not transfer additional or unnecessary items from the source sites due to the quantities that are limited by threshold amount. This improves transference efficiency relative to the conventional techniques that compute solutions which are capable of transferring unnecessary and additional items (e.g., not requested) from the source sites in order to simplify computations involved in completing the solutions because conventional techniques are not capable of completing these solutions in polynomial time. By contrast, the approximate fractional solution is not limited in this way and the approximate fractional solution is also usable to generate an integral approximate solution.

To do so, the transfer system identifies non-zero transfers of the approximate fractional solution and rounds the identified non-zero transfers to integral transfers. For instance, the transfer system uses the rounded integral transfers as fixed transfers to avoid performing numerous computations by the available computational resources. By avoiding the numerous computations in this manner, the integral approximate solution is possible to compute in polynomial time in this practical application which is not possible using conventional techniques.

To compute the integral approximate solution, the transfer system constructions a flow network automatically and without user intervention. The flow network includes a node for each of the plurality of the source sites and a node for each of the plurality of the destination sites. The transfer system uses the rounded integral transfers obtained from the approximate fractional solution to connect the nodes of the flow network. For example, the transfer system adds a directed edge to the flow network for each of the rounded integral transfers.

The transfer system generates the integral approximate solution that transfers the corresponding quantities of the types of requested items to each of the plurality of the destination sites using a maximum flow solver and the flow network. The integral approximate solution is accurate and transfers integral quantities of the types of requested items from the plurality of source sites. The integral approximate solution is also computable in polynomial time by the available computing resources which is not possible otherwise, for example, using conventional techniques.

In some examples, the transfer system causes transferences of the corresponding quantities of the types of requested items to each of the plurality of the destination sites based on the integral approximate solution. In one example, the transfer system causes the transferences indirectly such as by generating an indication of the integral approximate solution for display in a user interface of a display device. In other examples, the transfer system includes system processes and operating system applications for directly causing the transferences such as by controlling automated transference systems which is also not possible using conventional techniques that are inefficient and not completable in polynomial time.

Term Examples

As used herein, the term "item" refers to a physical or digital item which is transferable between physical locations. Examples of physical items include components of products, medical devices, complete products, etc. Examples of digital items include digital content, digital audio, digital media (e.g., digital movies), and so forth.

As used herein, the term "source site" refers to a physical location having at least one item that is available for transferring to a destination site.

As used herein, the term "destination site" refers to a physical location which receives at least one requested item from a source site.

As used herein, the term "transference" refers to a physical transfer of an item from a first physical location to a second physical location.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital systems and techniques as described herein. The illustrated environment 100 includes a computing device 102 connected to a network 104. As shown, the computing device 102 includes a storage device 106 and a transfer module 108. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The environment 100 also includes destination sites 110 and source sites 112 which are each shown as being connected to the network 104 in the illustrated example. In other examples, only the destination sites 110 are connected to the network 104 or only the source sites 112 are connected to the network 104. In some examples, the destination sites 110 are not connected to the network 104 and the source sites 112 are also not connected to the network 104.

The destination sites 110 are illustrated to include destination sites 114-120 for receiving items. For example, the computing device 102 receives request data 122 describing types of requested items (e.g., physical or digital) and corresponding quantities of the types of requested items to receive at each of the destination sites 114-120. The source sites 112 include source sites 124-130 for transferring items to the destination sites 114-120.

In an example, the source sites 112 include sensor systems 132-138 which are implemented to detect types of available items and corresponding quantities of the types of available items that are available at each of the source sites 124-130. For instance, each of the sensor systems 132-138 is connected to the network 104 and is capable of transmitting and/or receiving data via the network 104. As shown, sensor system 132 is associated with source site 124; sensor system 134 is associated with source site 126; sensor system 136 is associated with source site 128; and sensor system 138 is associated with source site 130. For example, each of the sensor systems 132-138 includes multiple sensors configured to detect quantities of the types of available items that are available at each of the source sites 124-130.

Consider an example in which the source site 124 includes a relatively large quantity of a type of available item that has a relatively small physical size. In this example, the sensor system 132 includes a pressure sensor such as a counting scale which detects the relatively large quantity of the type of available item that has the relatively small physical size in substantially real time. The sensor system 132 generates available data 140 describing the detected relatively large quantity of the type of available item and transmits the available data 140 to the transfer module 108 via the network 104.

Consider another example in which the source site 126 includes a relatively small quantity of a type of available item that has a relatively large physical size. The sensor system 134 includes an image sensor such as an image capture device. For instance, the sensor system 134 captures digital images depicting the relatively small quantity of the type of available item and performs object recognition on the captured digital images to detect the relatively small quantity of the type of available item in substantially real time. In this example, the sensor system 134 generates the available data 140 describing the detected relatively small quantity of the type of available item and transmits the available data 140 to the transfer module 108 via the network 104.

In one example, the source site 128 includes a type of available item with a tag such as an RFID tag or other tag capable of being detected. In this example, the sensor system 136 includes a tag reader such as an RFID tag reader, and the sensor system 136 detects a quantity of the type of available item by reading the tags. The sensor system 136 generates the available data 140 describing the detected quantity of the type of available item, and the sensor system 136 transmits the available data 140 to the transfer module 108.

Consider an example in which the sensor system 138 includes a radar system such as a millimeter-wavelength radar system. For example, the sensor system 138 implements the radar system to transmit radar waves within the source site 130 which reflect from types of available items that are available at the source site 130. The sensor system 138 receives reflected radar waves and processes the reflected radar waves to generate the available data 140 describing types of available items and corresponding quantities of the types of available items that are available at the source site 130. The sensor system 138 transmits the available data 140 to the transfer module 108 via the network 104.

As shown, the computing device 102 receives the available data 140 describing types of available items and corresponding quantities of the types of available items that are available at each of the source sites 124-130. Collectively, the request data 122 and the available data 140 are input data 142 which is illustrated to be included on the storage device 106 of the computing device 102. For example, the input data 142 describes types of requested items and corresponding quantities of the types of requested items to receive at each of the destination sites 114-120 as well as types of available items and corresponding quantities of the types of available items that are available at each of the source sites 124-130. Consider an example in which the items are components and the destination sites 114-120 are manufacturing sites that manufacture products from the components.

In this example, the destination site 114 and the destination site 118 manufacture products that include a first type of component and a second type of component. The destination site 116 manufactures products that include a third type of component and the first type of component. For instance, the destination site 120 manufactures products that include a fourth type of component, a fifth type of component, and the second type of component.

The destination sites 114-120 request components to manufacture the products based on a production schedule that indicates quantities of the products and corresponding quantities of the components. Continuing this example, the request data 122 describes a quantity of the first type of component to receive at each of the destination sites 114, 116, 118; a quantity of the second type of component to receive at each of the destination sites 114, 118, 120; a quantity of the third type of component to receive at the destination site 116; a quantity of the fourth type of component to receive at the destination site 120; and a quantity of the fifth type of component to receive at the destination site 120. In this continued example, the source sites 124-130 are component inventory sites which contain the components to manufacture the products.

For example, the source site 124 has some of the second type of component and some of the third type of component and the source site 126 has some of the first type of component and some of the fourth type of component. The source site 128 has some of the third type of component and some of the fifth type of component. For instance, the source site 130 has some of the first type of component and also some of the fifth type of component. Accordingly, the available data 140 describes a quantity of the second type of component and a quantity of the third type of component available at the source site 124; a quantity of the first type of component and a quantity of the fourth type of component available at the source site 126; a quantity of the third type of component and a quantity of the fifth type of component available at the source site 128; and a quantity of the first type of component and a quantity of the fifth type of component available at the source site 130.

The computing device 102 receives the request data 122 and the available data 140 as the input data 142 and the computing device 102 implements the transfer module 108 to process the input data 142 to generate shipment data 144. To do so, the transfer module 108 determines a solution that transfers the components from the source sites 124-130 to the destination sites 114-120 and minimizes a transfer cost to transfer the components to the destination sites 114-120. For example, each link which transfers components from one of the source sites 124-130 to one of the destination sites 114-120 is associated with a transfer cost.

In this example, the transfer cost does not increase if a large number of components are transferred or decrease if a small number of components are transferred via a particular link. Instead, after incurring the transfer cost to establish a link between one of the source sites 124-130 and one of the destination sites 114-120, there is no additional transfer cost to transfer one component or many components via the established link. Because of this, the transfer module 108 minimizes the transfer cost to transfer the components to the destination sites 114-120 by minimizing a number of links established between the source sites 124-130 and the destination sites 114-120.

To do so, the transfer module 108 determines the solution that transfers the components from the source sites 124-130 to the destination sites 114-120, for example, using a minimum number of the source sites 124-130 capable of transferring the requested types and quantities of the components to the destination sites 114-120. In one example, the transfer module 108 determines the solution by minimizing a cumulative transfer cost for a particular destination site of the destination sites 110. In another example, the transfer module 108 determines the solution by minimizing a cumulative transfer cost for all of the destination sites 114-120.

In an example, the transfer module 108 determines a solution that transfers the components from the source sites 124-130 to the destination sites 114-120 and minimizes the transfer cost to transfer the components to the destination sites 114-120 by representing the solution to the component transfer problem as a solution to a set cover problem. For instance, the transfer module 108 defines the solution to the set cover problem as being a smallest subset of the source sites 112 that contain all of the types and quantities of the components requested by the destination sites 114-120. By this definition, an optimal subset of the source sites 112 for the set cover instance is equal to an optimal subset of the source sites 112 for an item transfer instance. This item transfer instance is a solution to the component transfer problem. Since the set cover problem may not be approximated in polynomial time, the component transfer problem also may not be approximated in polynomial time.

In order to approximate the component transfer problem, the transfer module 108 solves a linear programing relaxation of the component transfer problem which is solvable in polynomial time and returns a fractional solution. This fractional solution is not feasible for transferring the components to the destination sites 114-120 because fractions of the components are not transferable. The transfer module 108 rounds this fractional solution into an integral approximate solution which is feasible for transferring the components to the destination sites 114-120.

To do so, the transfer module 108 generates an approximate fractional solution to the component transfer problem by sampling an integral solution based on a distribution defined by the fractional solution a number of times. Each of the times produces a new sampled solution which is not a feasible solution in some examples. The transfer module 108 generates the approximate fractional solution by averaging the new sampled solutions. This ensures that the approximate fractional solution has a corresponding transfer cost that is at most a constant value times a transfer cost of an optimal fractional solution to the component transfer problem. Additionally, variables of the approximate fractional solution that are representative of links between the source sites 112 and the destination sites 110 and which have values greater than zero have relatively large fractional values. In this manner, the approximate fractional solution transfers the components to the destination sites 114-120 and the approximate fractional solution is capable of exceeding quantities of the components included in the source sites 124-130 by at most a threshold amount.

Consider an example in which the fractional solution transfers the components to the destination sites 114-120 from a first subset of the source sites 112 and the approximate fractional solution transfers the components to the destination sites 114-120 from a second subset of the source sites 112. In one example, a particular group of the source sites 112 included in the first subset is also included in the second subset. In another example, the particular group of the source sites 112 included in the first subset is not included in the second subset. In an additional example, the particular group of the source sites 112 included in the first subset is partially included in the second subset.

The transfer module 108 rounds the approximate fractional solution to an integral bi-criteria approximate solution. To do so, the transfer module 108 rounds all non-zero values that are representative of the links between the source sites 124-130 and the destination sites 114-120 to equal 1. The transfer module 108 solves the linear programing relaxation of the component transfer problem again using the rounded variables that are representative of the links by constructing a flow network with integral capacities.

To construct the flow network, the transfer module 108 generates a flow source node and a flow sink node as well as a source node for each of the source sites 124-130 and a destination node for each of the destination sites 114-120. The transfer module 108 then adds directed edges between the flow source node and the destination nodes and also adds directed edges between the flow sink node and the source nodes. For each of the variables that are representative of the links that has a value of 1, the transfer module 108 adds a directed edge between a corresponding destination node and a corresponding source node with infinity capacity.

For example, the transfer module 108 uses a maximum flow solver and the flow network to generate an integral approximate solution that transfers the components from the source sites 124-130 to the destination sites 114-120 and minimizes the corresponding transfer cost. In one example, the transfer module 108 samples a particular source node of the flow network, adds an edge between the particular source node and a particular destination node, and randomly samples a quantity interval for a type of available item that is available at a particular source site corresponding to the particular source node as part of generating the integral approximate solution. This integral approximate solution is the integral bi-criteria approximate solution to the component transfer problem. The integral bi-criteria approximate solution the transfers the components to the destination sites 114-120 and exceeds quantities of the components included in the source sites 124-130 by at most the threshold amount. The transfer module 108 generates the shipment data 144 as describing the integral bi-criteria approximate solution and transmits the shipment data 144 to the source sites 112 to cause transferences of the components to the destination sites 114-120.

The source sites 112 receive the shipment data 144 and process the shipment data 144 to transfer components from the source sites 124-130 to the destination sites 114-120 based on the integral bi-criteria approximate solution to the component transfer problem. For example, the destination site 114 receives the requested quantity of the first type of component and the requested quantity of the second type of component. The destination site 116 receives the requested quantity of the first type of component and the requested quantity of the third type of component. Similarly, the destination site 118 receives the requested quantity of the first type of component and the requested quantity of the second type of component. Additionally, the destination site 120 receives the requested quantity of the second type of component, the requested quantity of the fourth type of component, and the requested quantity of the fifth type of component.

It is to be appreciated that the described item transfer systems are not limited to scenarios in which the items are components, the destination sites 114-120 are manufacturing sites that manufacture products from the components, and the source sites 124-130 are component inventory sites which contain the components to manufacture the products. Consider an example in which the items are surgical instruments or medical devices and the destination sites 114-120 are hospitals or surgery centers. In this example, each of the destination sites 114-120 has a surgical schedule that indicates quantities of types of surgical procedures to be performed and corresponding quantities of types of surgical instruments for performing the scheduled surgical procedures.

Accordingly, each of the destination sites 114-120 requests quantities of types of surgical instruments based on the surgical schedules. For instance, the destination site 114 requests a quantity of ophthalmic surgical instruments for performing scheduled ophthalmic surgeries and also requests a quantity of neurosurgical instruments for performing scheduled neurosurgeries. For example, the destination site 116 requests a quantity of the ophthalmic surgical instruments for performing scheduled ophthalmic surgeries and also requests a quantity of orthopedic surgical instruments for performing scheduled orthopedic surgical procedures.

Continuing this example, the source sites 124-130 are warehouses which contain the surgical instruments for performing the scheduled procedures. For instance, the sensor system 132 generates the available data 140 describing types of available surgical instruments and corresponding quantities of the types that are available at the source site 124; the sensor system 134 generates the available data 140 describing types of available surgical instruments and corresponding quantities of the types that are available at the source site 126; the sensor system 136 generates the available data 140 describing types of available surgical instruments and corresponding quantities of the types that are available at the source site 128; and the sensor system 138 generates the available data 140 describing types of available surgical instruments and corresponding quantities of the types that are available at the source site 130. The transfer module 108 processes input data 142 describing types of requested surgical instruments and corresponding quantities of the types of requested surgical instruments to receive at each of the destination sites 114-120 as well as types of available surgical instruments and corresponding quantities of the types of available surgical instruments that are available at each of the source sites 124-130 to generate shipment data 144. In this example, the shipment data 144 describes an integral bi-criteria approximate solution to the surgical instrument transfer problem that minimizes a transfer cost of transferring the quantities of the types of requested surgical instruments to each of the destination sites 114-120.

Consider another example in which the items are digital content items and the destination sites 114-120 are remote server systems which generate the request data 122 as describing requests for quantities of types of the digital content items for distribution to client devices of the destination sites 114-120. In this example, the source sites 124-130 are local server systems which have quantities of the types of the digital content items available, e.g., as part of a digital rights management system. The available data 140 describes the types of digital content items and quantities of the types of digital content items available at each of the source sites 124-130. The transfer module 108 processes the input data 142 which describes the types of digital content items and the quantities of the types of digital content items requested by each of the destination sites 114-120 as well as the types of digital content items and the quantities of the types of digital content items available at each of the source sites 124-130 to generate shipment data 144. For example, the shipment data 144 describes an integral bi-criteria approximate solution to the digital content transfer problem that minimizes a transfer cost of transferring the quantities of the types of requested digital content items to each of the destination sites 114-120 based on a digital rights management policy of the digital rights management system.

In addition to having processor and memory resources for computing the integral bi-criteria approximate solution described by the shipment data 144, the transfer module 108 also includes system processes and operating system applications for causing transferences of the quantities of the types of requested surgical instruments to each of the destination sites 114-120. In one example, the transfer module 108 directly causes the transferences by controlling automated transference systems. In another example, the transfer module 108 indirectly causes the transferences by generating an indication of the integral bi-criteria approximate solution for display in a user interface.

Figure 2:
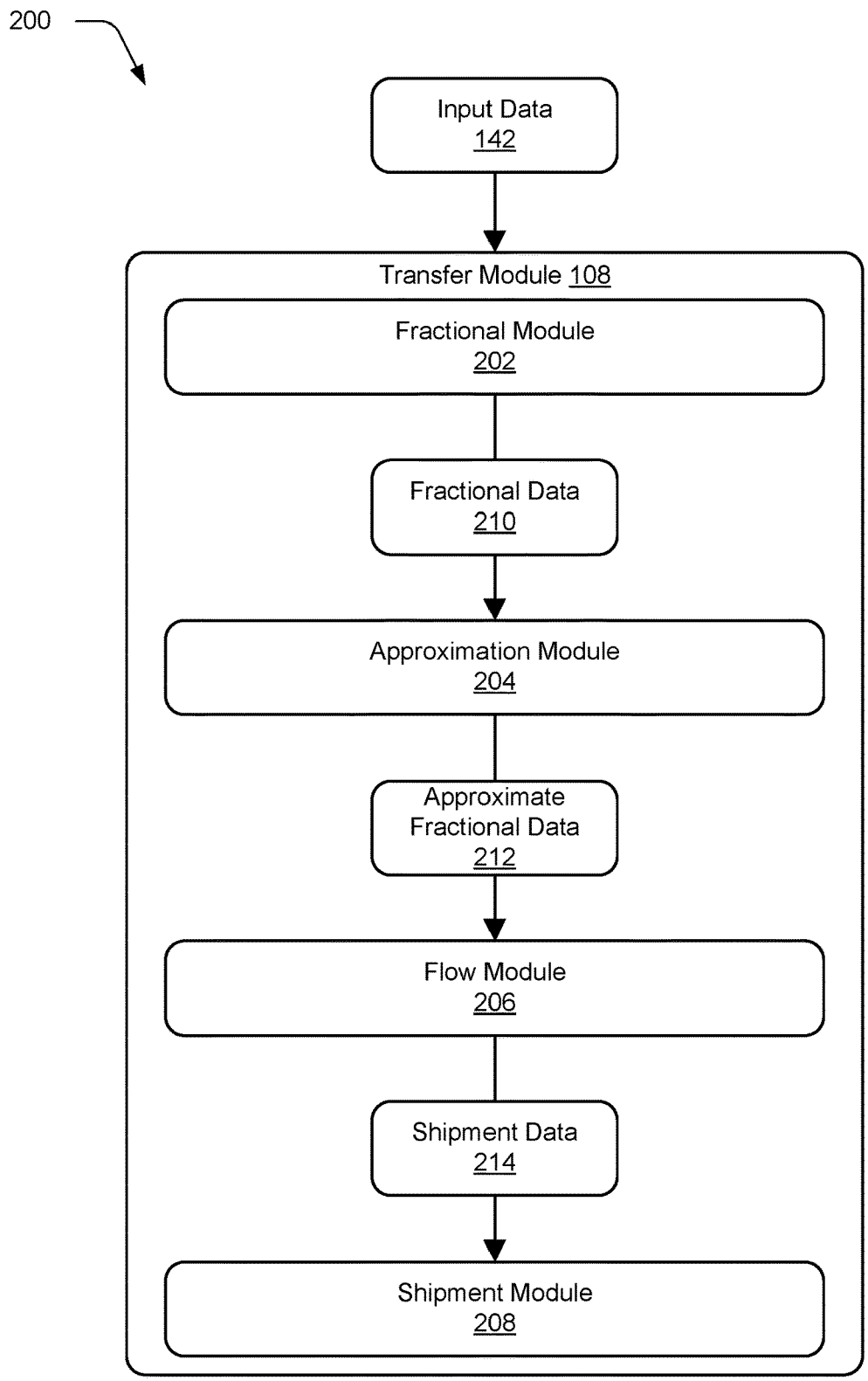
FIG. 2 depicts a system in an example implementation showing operation of a transfer module for transferring items.

FIG. 2 depicts a system 200 in an example implementation showing operation of a transfer module 108. The transfer module 108 is illustrated to include a fractional module 202, an approximation module 204, a flow module 206, and a shipment module 208. The fractional module 202 is illustrated as receiving the input data 142 which describes types of requested items and corresponding quantities of the types of requested items to receive at each of a plurality of destination sites. For example, the input data 142 also describes types of available items and corresponding quantities of the types of available items that are available at each of a plurality of source sites.

Figure 3A:
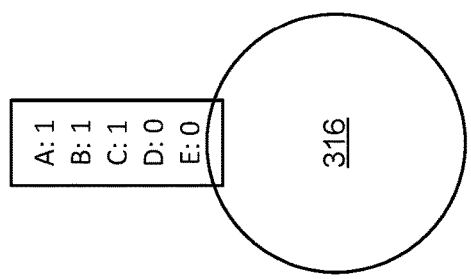
FIGS. 3A, 3B, 3C, and 3D illustrate examples of transferring items from source sites to destination sites.
Figure 3A:
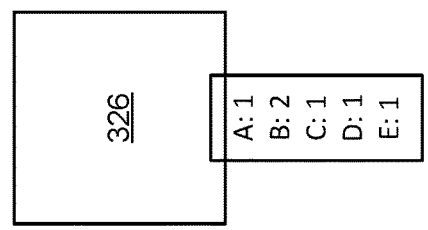
Figure 3A:
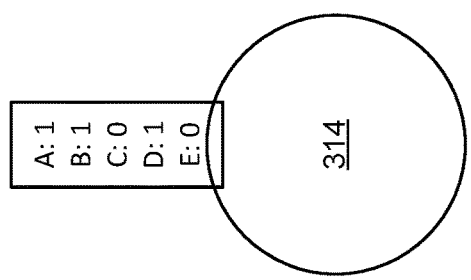
Figure 3A:
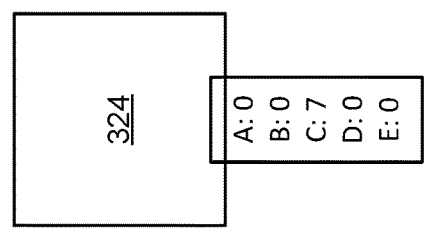
Figure 3A:
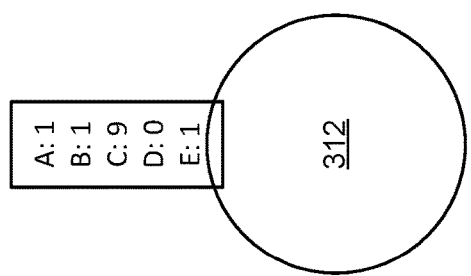
Figure 3A:
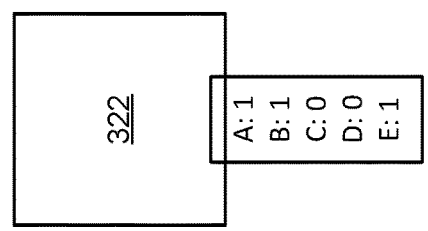
Figure 3A:
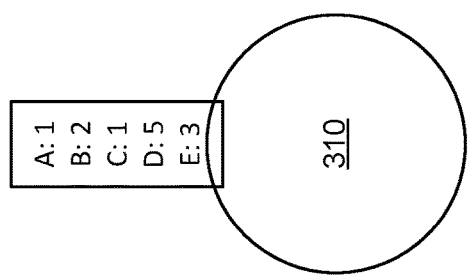
Figure 3A:
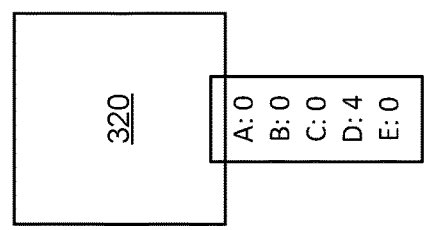
Figure 3A:
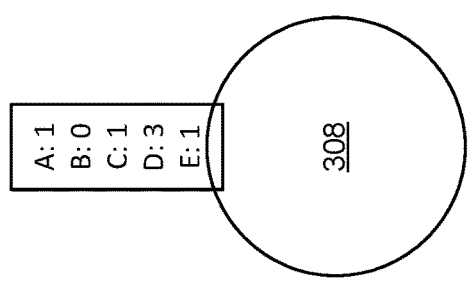
Figure 3A:
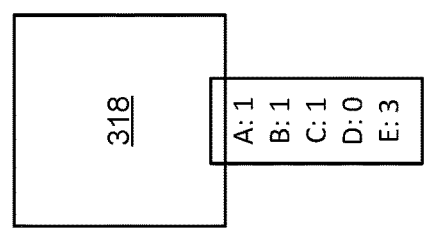
Figure 3B:
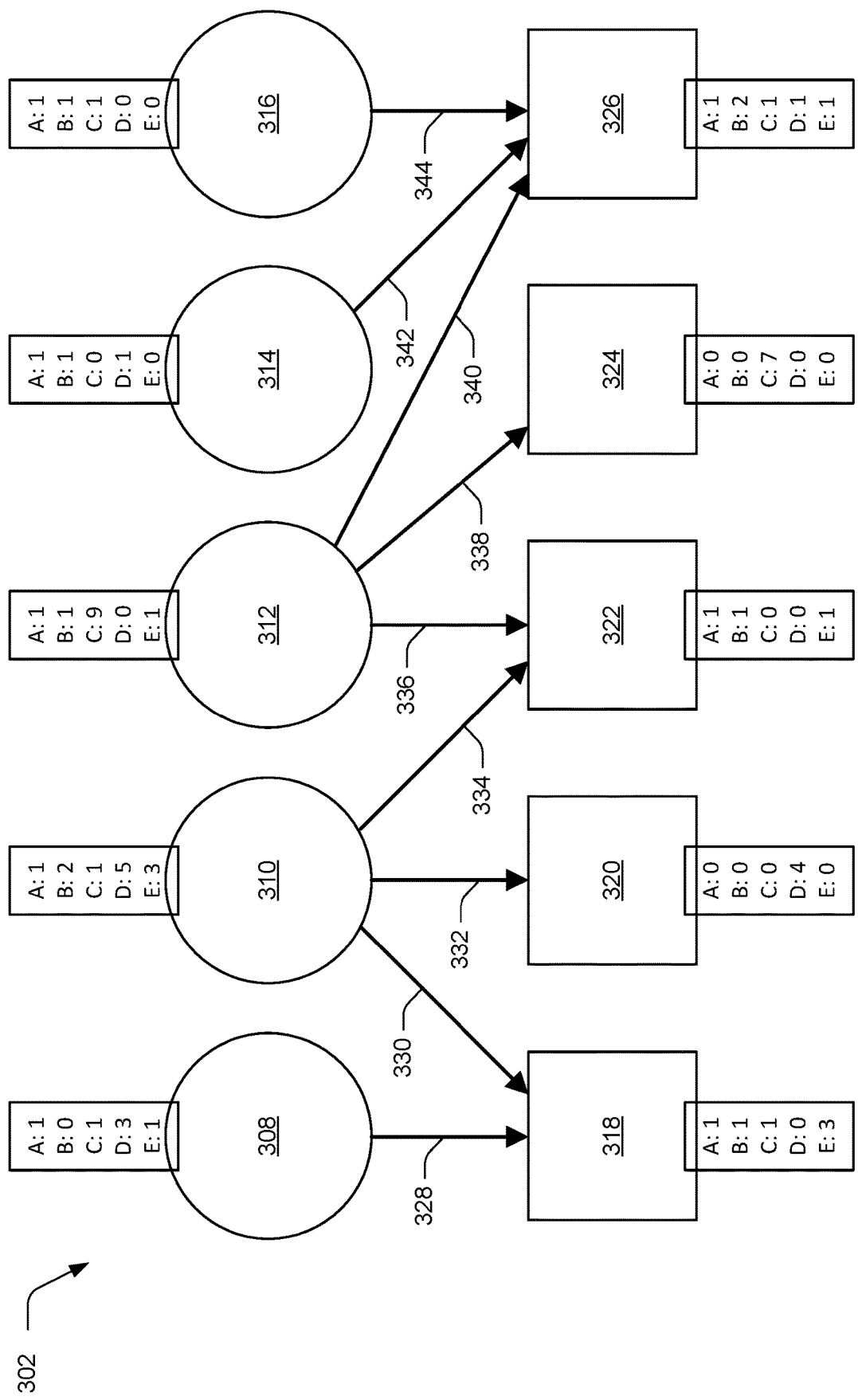
Figure 3C:
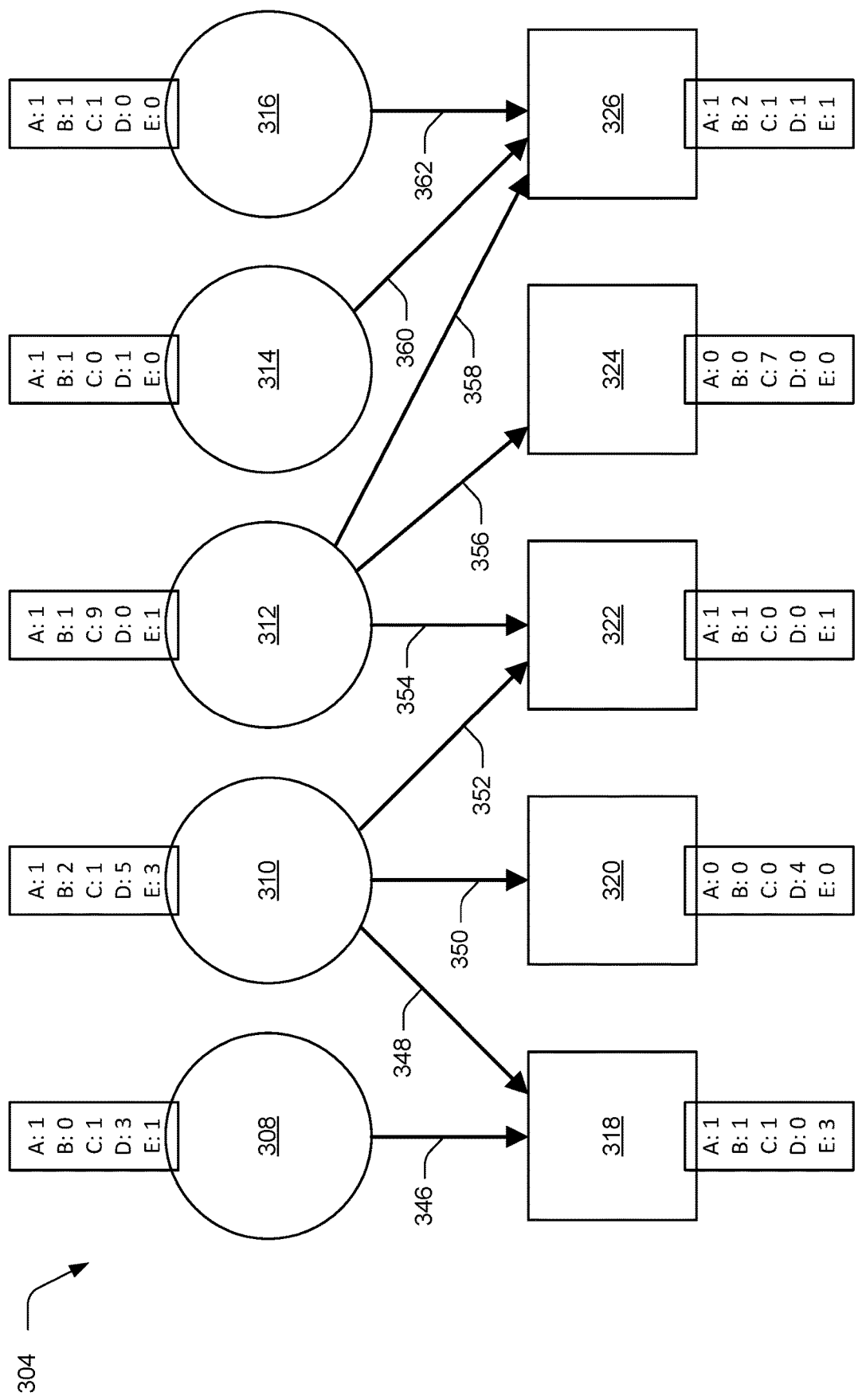
Figure 3D:
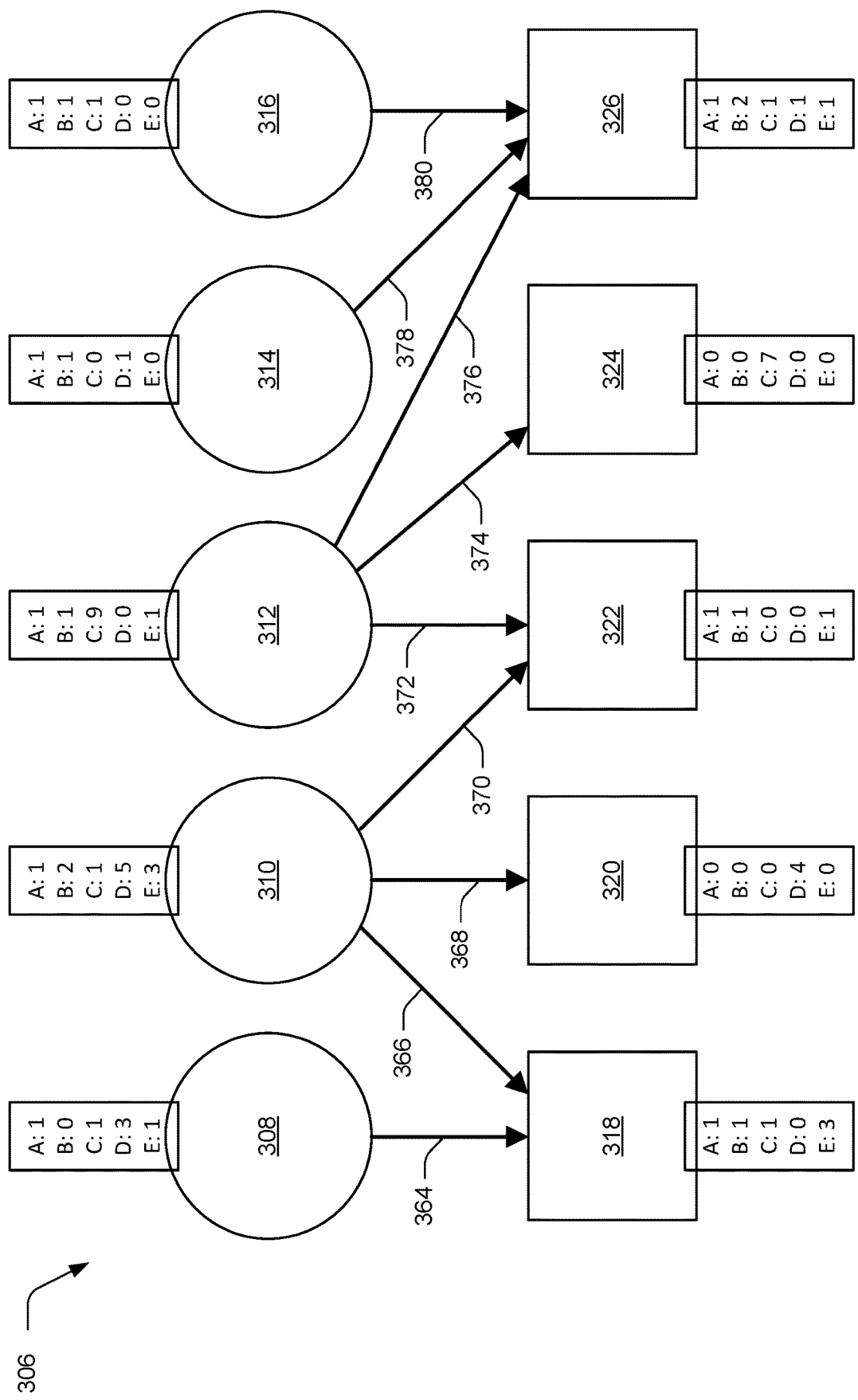

FIGS. 3A, 3B, 3C, and 3D illustrate examples of transferring items from source sites to destination sites. FIG. 3A illustrates a representation 300 of the input data 142. FIG. 3B illustrates a representation 302 of a fractional solution to an item transfer problem. FIG. 3C illustrates a representation 304 of an approximate fractional solution to the item transfer problem. FIG. 3D illustrates a representation 306 of an integral approximate solution to the item transfer problem.

With reference to FIGS. 2 and 3A, the fractional module 202 receives the input data 142 which describes source sites 308-316 and destination sites 318-326. As shown in the representation 300, source site 308 has one type A item, one type C item, three type D items, and one type E item available; source site 310 has one type A item, two type B items, one type C item, five type D items, and three type E items available; source site 312 has one type A item, one type B item, nine type C items, and one type E item available; source site 314 has one type A item, one type B item, and one type D item available; and source site 316 has one type A item, one type B item, and one type C item available. Destination site 318 requests one type A item, one type B item, one type C item, and three type E items; destination site 320 requests four type D items; destination site 322 requests one type A item, one type B item, and one type E item; destination site 324 requests seven type C items; and destination site 326 requests one type A item, two type B items, one type C item, one type D item, and one type E item.

The fractional module 202 represents this item transfer problem as a problem solvable with linear programming. In one example, this is representable as:

For each $i \in C$, $j \in W$, $e \in U$: $x_{i,j}(e) \in [0, \min(d_i(e), s_j(e))]$ For each $i \in C$, $j \in W$: $y_{i,j} \in [0,1]$ $x_{i,j}(e) \leq y_{i,j} * \min(d_i(e), s_j(e))$ for each $e \in U$ where: C is a set of i destination sites 318-326; W is a set of j source sites 308-316; U is a set of e item types A-E; $x_{i,j}(e)$ denotes a quantity of item e transferred to destination site i from source site j; $d_i(e)$ denotes a quantity of item e requested by destination site i; $s_j(e)$ denotes a quantity of item e available at source site j; and $y_{i,j}$ indicates whether a link is established between destination site i and source site j where $y_{i,j}$ equals 1 if the link is established and $y_{i,j}$ equals 0 if the link is not established.

The fractional module 202 minimizes a transfer cost by minimizing a number of established links between the source sites 308-316 and the destination sites 318-326. In an example, this is representable as:

$$\min_{x,y} \sum_{i \in C, j \in W} c_{i,j} y_{i,j}$$

such that:

$x_{i,j}(e) \leq y_{i,j} * \min(d_i(e), s_i(e))$ for all $e \in U$, $i \in C$, and $j \in W$ $\sum_{j \in W} x_{i,j}(e) = d_i(e)$ for all $i \in C$ and $e \in U$ $\sum_{i \in C} x_{i,j}(e) \leq s_j(e)$ for all $j \in W$ and $e \in U$ $y_{i,j} \geq 0$, $x_{i,j}(e) \geq 0$ for all $i \in C$, $j \in W$, and $e \in U$ $OPT_{LP} \leq OPT$ where: $c_{i,j}$ is a transfer cost by definition; $OPT_{LP}$ denotes a fractional linear programming optimal solution to the item transfer problem; and OPT denotes an integral linear programming optimal solution to the item transfer problem.

The fractional module 202 computes the $OPT_{LP}$ which is illustrated as the representation 302 depicted in FIG. 3B. As shown, the representation 302 includes links 328-344. Link 328 is established between the source site 308 and the destination site 318 and transfers one type A item, 0.5 type C items, and one type E item from items available at the source site 308 to the destination site 318. Link 330 is established between the source site 310 and the destination site 318. The link 330 transfers one type B item, 0.5 type C items, and two type E items from items available at the source site 310 to the destination site 318. By establishing the links 328, 330 the fractional module 202 transfers quantities of items requested by the destination site 318; however, these transfers are not feasible because fractional transfers of the type C item are not possible.

Link 332 is established between the source site 310 and the destination site 320. For example, the link 332 transfers four type D items to the destination site 320 from items available at the source site 310. Since the link 332 transfers an integral quantity of the type D items, this transfer is feasible because integral transfers of the type D items are possible.

Link 334 is established between the source site 310 and the destination site 322. The link 334 transfers 0.5 type A items, 0.5 type B items, and one type E item to the destination site 322. Link 336 is established between the source site 312 and the destination site 322. For instance, the link 336 transfers 0.5 type A items and 0.5 type B items to the destination site 322. Although the links 334, 336 transfer quantities of items requested by the destination site 322, the fractional transfers of the type A item and the type B item are not feasible.

As illustrated in FIG. 3B, link 338 is established between the source site 312 and the destination site 324. The link 338 transfers seven type C items from available items at the source site 312 to the destination site 324. The transfer of the type C items is not a fractional transfer in this example. Rather, this is an integral transfer which is feasible.

Link 340 is established between the source site 312 and the destination site 326. For example, the link 340 transfers 0.33 type A items (or ⅓ of a type A item) and one type E item to the destination site 326. As shown, link 342 is established between the source site 314 and the destination site 326 and transfers 0.33 type A items (or ⅓ of a type A item), one type B item, and one type D item to the destination site 326. Link 344 is established between the source site 316 and the destination site 326. The link 344 transfers 0.33 type A items (or ⅓ of a type A item), one type B item, and one type C item to the destination site 326. While the links 340, 342, 344 transfer requested quantities of items to the destination site 326, these transfers are not feasible due to the fractional transfers of the type A item.

With reference to FIG. 2, the fractional module 202 generates the fractional data 210 as describing the $OPT_{LP}$ or the fractional linear programming optimal solution to the item transfer problem. The approximation module 204 receives the fractional data 210 and processes the fractional data 210 to generate approximate fractional data 212. To do so in one example, the approximation module 204 samples an integral solution based on a distribution defined by the fractional solution described by the fractional data 210.

For example, the approximation module 204 defines a (1+∈) approximate transfer which is representable as:

$$\sum_{j \in W} x_{i,j}(e) = d_i(e) \text{ for all } i \in C \text{ and } e \in U$$

$$\sum_{i \in C} x_{i,j}(e) \leq (1+\epsilon)s_i(e) \text{ for all } j \in W \text{ and } e \in U$$

where: (1+∈) is maximum factor by which quantities of available items at the source sites 308-316 are exceeded to transfer quantities of requested items to the destination sites 318-326.

Using the (1+∈) approximate transfer, the approximation module 204 defines a bi-criteria approximation item transfer problem. In an example, this is representable as:

$$tcost(Y) \leq \alpha * \frac{\min}{X} tcost(X)$$

where: tcost(Y) is a transfer cost of an approximate transfer Y; is a $$\frac{\min}{X} tcost(X)$$

transfer cost of a transfer X; and α is a constant.

The approximation module 204 samples the integral solution based on the distribution defined by the fractional solution described by the fractional data 210 and with a success probability of 0.5 generates an approximate fractional solution y' such that y' is a (1+∈) approximate transfer, has a transfer cost at most a constant times the $OPT_{LP}$, and $y'_{i,j}$ variables have relatively large fractional values. For example, the approximation module 204 repeats the sampling process l number of rounds and then averages the sampled solutions to generate the approximate fractional solution. By averaging the sampled solutions in this manner, the approximation module 204 ensures that non-zero variables in the approximate fractional solution have values of at least $$\frac{1}{l}$$

which produces a fractional solution. In one example, the approximation module 204 increases the success probably from 0.5 to 1−δ by performing the sampling procedure for log $$\frac{1}{\delta}$$

number of rounds. In an example, this is representable as:

$$l \equiv O\left(\frac{\log n}{\epsilon^2}\right)$$

for $t \in [1, l]$ do

For each $i \in C$ and $j \in W$, let $Y_{i,j}^t$ be a random variable defined as follows $\quad Y_{i,j}^t \equiv 1$ with probability $y_{i,j}$ and 0 otherwise For each $i \in C, j \in W, e \in U$, let $X_{i,j}^t(e)$ be a random variable conditionally on $Y_{i,j}^t$ as follows $X_{i,j}^t(e) \mid \{Y_{i,j}^t = 1\} \equiv$ $\quad \min(d_i(e), s_i(e))$ with probability $\dfrac{x_{i,j}(e)}{y_{i,j} \cdot \min(d_i(e), s_i(e))}$ and 0 otherwise $X_{i,j}^t(e) \mid \{Y_{i,j}^t = 0\} \equiv 0$ with probability 1 end construct $(x', y')$ as follows $$x'_{i,j}(e) \equiv \frac{1}{l} \sum_{t \in [1,l]} X_{i,j}^t(e)$$

$$y'_{i,j}(e) \equiv \frac{1}{l} \sum_{t \in [1,l]} Y_{i,j}^t$$

where: $Y_{i,j}^t$ is a random variable; and $X_{i,j}^t(e)$ is a random variable defined conditionally on $Y_{i,j}^t$.

The approximation module 204 generates the approximate fractional data 212 as describing the approximate fractional solution (x', y') which is illustrated in the representation 304 depicted in FIG. 3C. As shown, the representation 304 includes links 346-362. Link 346 is established between the source site 308 and the destination site 318. The link 346 transfers one type A item, 0.5 type C items, and 1.5 type E items to the destination site 318. Link 348 is established between the source site 310 and the destination site 318, and the link 348 transfers one type B item, 0.5 type C items, and 1.5 type E items to the destination site 318. The fractional transfer of the type C item and the fractional transfer of the type E items are not feasible. The link 346 also exceeds a quantity of available type E items at the source site by 0.5 type E items.

Link 350 is established between the source site 310 and the destination site 320. For instance, the link 350 transfers four type D items from the source site 310 to the destination site 320. Since this is not a fractional transfer of the type D items, this represents a feasible transfer. Additionally, the link 350 does not exceed a quantity of type D items at the source site 310.

Link 352 is established between the source site 310 and the destination site 322. The link 352 transfers 0.5 type A items, 0.5 type B items, and one type E item to the destination site 322. As shown, link 354 is established between the source site 312 and the destination site 322, and the link 354 transfers 0.5 type A items and 0.5 type B items to the destination site 322. However, these transfers are not feasible because of the fractional transfer of the type A item and the type B item.

Link 356 is established between the source site 312 and the destination site 324. For example, the line 356 transfers seven type C items to the destination site 324. This is a feasible transfer and does not exceed a quantity of type C items at the source site 312.

As illustrated in the representation 304, link 358 is established between the source site 312 and the destination site 326. The link 358 transfers 0.33 type A items (or ⅓ of a type A item) and one type E item from the source site 312 to the destination site 326. Link 360 is established between the source site 314 and the destination site 326, and the link 360 transfers 1.5 type B items, 0.33 type A items (or ⅓ of a type A item), and one type D item to the destination site 326. Finally, link 362 is established between the source site 316 and the destination site 326. The link 362 transfers 0.33 type A items (or ⅓ of a type A item), 0.5 type B items, and one type C item to the destination site 326. The transfer of the 1.5 type B items via the link 360 exceeds a quantity of type B items at the source site 314 by 0.5 type B items.

As shown in FIG. 2, the approximation module 204 generates the approximate fractional data 212 as describing the approximate fractional solution illustrated in FIG. 3C. For example, the flow module 206 receives the approximate fractional data 212 and processes the approximate fractional data 212 to generate shipment data 214. To do so, the flow module 206 rounds all non-zero y' described by the approximate fractional data 212 to equal 1. The flow module 206 then constructs y" by solving the linear programming representation of the item transfer problem again for x with y variables set to y" by constructing a flow network with integral capacities and using a maximum flow solver.

In one example, the flow module 206 constructs the flow network by generating a flow source node s and a flow sink node t. The flow module 206 then generates destination nodes i and source nodes j for each $i \in C$ and $j \in W$. Next, the flow module 206 adds a directed edge (s, i) between the flow source node s and the destination nodes $i \in C$ with capacity $d_i(e)$. The flow module 206 also adds a directed edge (j, t) between the source nodes $j \in W$ and the flow sink node t with capacity $(1+2\epsilon)s_1$ (e). Finally, for every $i \in C$ and $j \in W$ such that y"=1, the flow module 206 adds a directed edge (i, j) between destination node i and source node j with infinity capacity.

For example, the flow module 206 uses the maximum flow solver and the constructed flow network and sets x" to equal an integral flow returned by the maximum flow solver. Accordingly, the y" variables are integral and the basic feasible solution x" to the linear programming representation of the item transfer problem is also integral. The flow module 206 generates the shipment data 214 as describing the integral approximate solution (x", y") which is illustrated in the representation 306 depicted in FIG. 3D.

The representation 306 includes links 364-380 and link 364 is established between the source site 308 and the destination site 318. The link 364 transfers one type A item, one type C item, and one type E item to the destination site 318. Link 366 is established between the source site 310 and the destination site 318, and the link 366 transfers one type B item and two type E items to the destination site 318. The links 364, 366 transfer integral quantities of requested items to the destination site 318 which are feasible transfers.

Link 368 is established between the source site 310 and the destination site 320. The link 368 transfers four type D items to the destination site 320 which is an integral transfer. Link 370 is established between the source site 310 and the destination site 322, and the link 370 transfers one type A item and one type E item to the destination site 322. As shown, link 372 is established between the source site 312 and the destination site 322. The link 372 transfers one type B item to the destination site 322. Because the links 370, 372 transfer integral quantities of the requested items to the destination site 322, these transfers are feasible transfers of the items.

In the illustrated example, link 374 is established between the source site 312 and the destination site 324. The link 374 transfers seven type C items to the destination site 324 which is an integral transfer and is feasible. Link 376 is established between the source site 312 and the destination site 326, and the link 376 transfers one type E item to the destination site 326. As shown, link 378 is established between the source site 314 and the destination site 326, and the link 378 transfers one type A item, one type B item, and one type D item to the destination site 326.

Link 380 is established between the source site 316 and the destination site 326. The link 380 transfers one type B item and one type C item to the destination site 326. Since the links 376, 378, 380 transfer integral quantities of the requested items to the destination site 326, these transfers are feasible transfers.

With reference to FIG. 2, the shipment module 208 receives the shipment data 214 describing the integral approximate solution (x", y") which is illustrated in the representation 306. The shipment module 208 processes the shipment data 214 to cause transferences of the items requested by the destination sites 318-326 from the items available at the source sites 308-316 based on the integral approximate solution (x", y"). In one example, the shipment module 208 causes the transferences directly such as using an automated item transfer system. In another example, the shipment module 208 causes the transferences indirectly such as by generating an indication of the integral approximate solution (x", y") for display in a user interface of a display device.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 4:
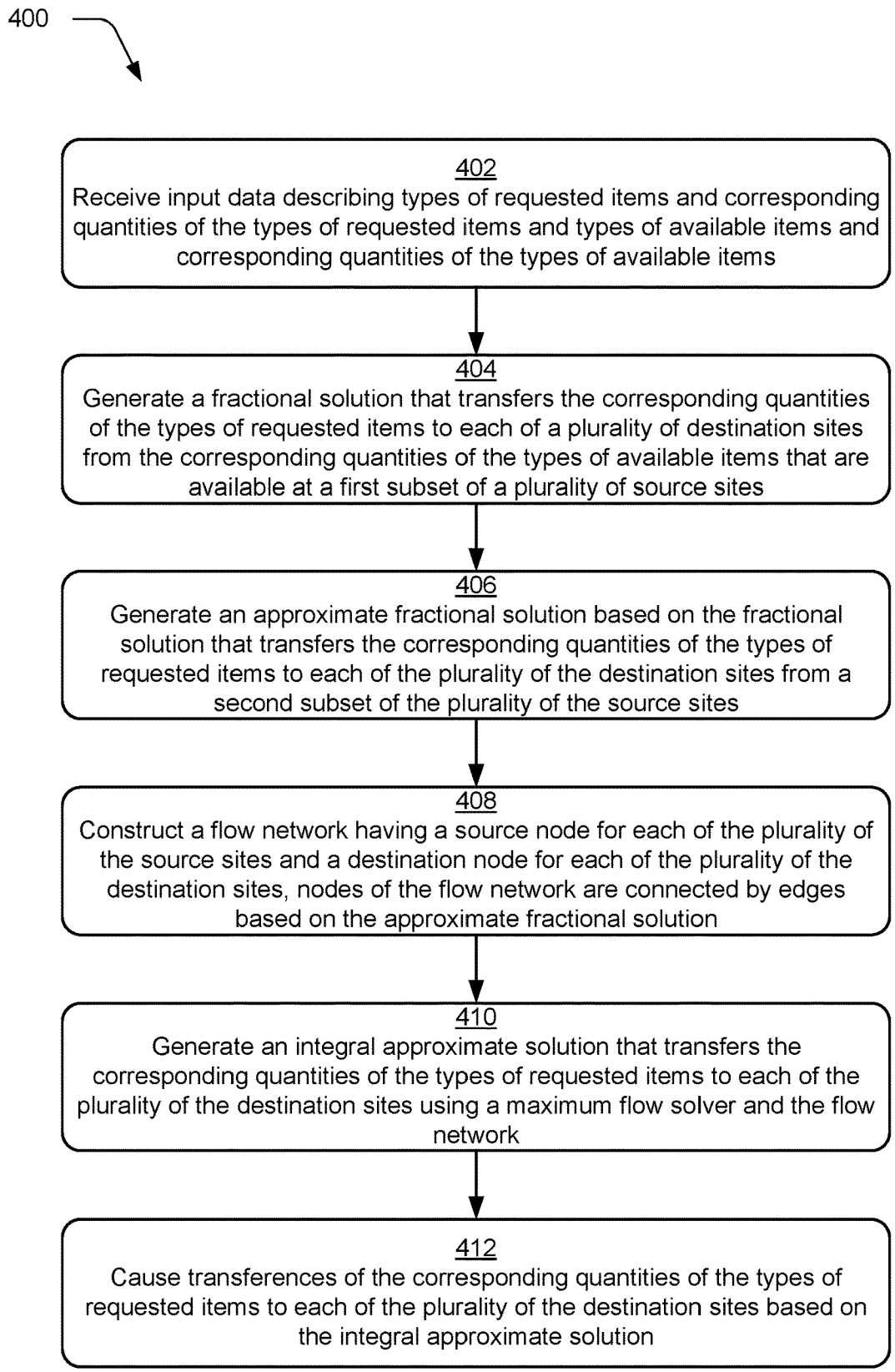
FIG. 4 is a flow diagram depicting a procedure in an example implementation in which input data describing types of requested items and corresponding quantities of the types of requested items and types of available items and corresponding quantities of the types of available items is received and transferences are caused of the corresponding quantities of the types of requested items to each of a plurality of destination sites.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which input data describing types of requested items and corresponding quantities of the types of requested items and types of available items and corresponding quantities of the types of available items is received and transferences are caused of the corresponding quantities of the types of requested items to each of a plurality of destination sites. Input data is received (block 402) describing types of requested items and corresponding quantities of the types of requested items to receive at each of a plurality of destination sites and types of available items and corresponding quantities of the types of available items that are available at each of a plurality of source sites. For example, the computing device 102 implements the transfer module 108 to receive the input data.

A fractional solution is generated that transfers the corresponding quantities of the types of requested items to each of the plurality of the destination sites from the corresponding quantities of the types of available items that are available at a first subset of the plurality of the source sites (block 404). In one example, the transfer module 108 generates the fractional solution. An approximate fractional solution is generated based on the fractional solution that transfers the corresponding quantities of the types of requested items to each of the plurality of the destination sites from a second subset of the plurality of the source sites (block 406). The computing device 102 implements the transfer module 108 to generate the approximate fractional solution in an example.

A flow network is constructed having a source node for each of the plurality of the source sites and a destination node for each of the plurality of the destination sites, nodes of the flow network are connected by edges based on the approximate fractional solution (block 408). For example, the transfer module 108 constructs the flow network. An integral approximate solution is generated that transfers the corresponding quantities of the types of requested items to each of the plurality of the destination sites using a maximum flow solver and the flow network (block 410). In an example, the computing device 102 implements the transfer module 108 to generate the integral approximate solution. Transferences are caused of the corresponding quantities of the types of requested items to each of the plurality of the destination sites based on the integral approximate solution (block 412). The transfer module 108 causes the transferences in some examples.

Figure 5:
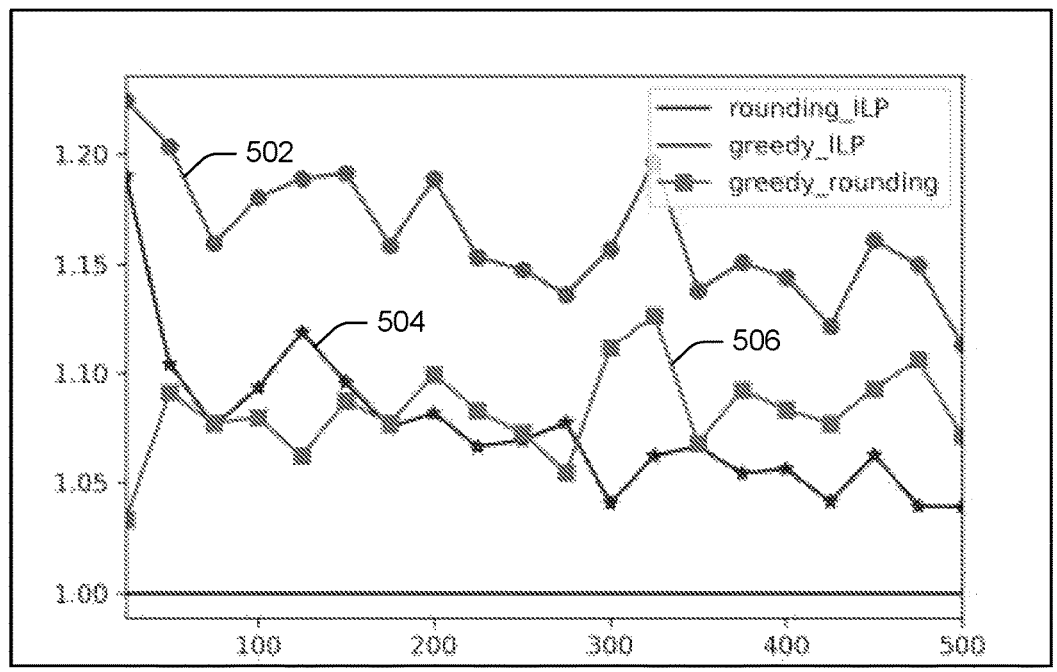
FIG. 5 illustrates a representation of example improvements in performance of the described item transfer systems relative to performance of conventional systems.

FIG. 5 illustrates a representation 500 of example improvements in performance of the described item transfer systems relative to performance of conventional systems. As shown, the representation includes plots of first ratios 502, second ratios 504, and third ratios 506. In order to determine the ratios 502, 504, 506, the transfer module 108 establishes five source sites, five destination sites, quantities of types of items to transfer to the destination sites ranging from 25 to 500, and probabilities p=q=0.5. The transfer module 108 then determines an exact solution to an item transfer problem using integer linear programming which has an exponential runtime.

Next, the transfer module 108 determines a conventional or "greedy" solution to the item transfer problem using the integer linear programing which also has an exponential runtime. Because both the exact solution and the "greedy" solution have exponential runtimes, these solutions are unable to scale to large problem instances. The conventional or "greedy" solution considers each type of item one-by-one and at each step determines a feasible transfer for one type of item. The ratios 502 are computed as a transfer cost of the conventional or "greedy" solution to a transfer cost of the exact solution. As shown in the representation 500, the transfer cost of the conventional or "greedy" solution is about 24 percent higher than the transfer cost of the exact solution for 25 items. The transfer cost of the conventional or "greedy" solution is about 12 percent higher than the transfer cost of the exact solution for 500 items.

The transfer module 108 also determines a solution to the item transfer problem using the described item transfer systems. To do so, the transfer module 108 first samples subsets of items available at the source sites. For each of the source sites j, the transfer module 108 samples a subset of item types independently with probability p. For each destination site i, the transfer module 108 samples a subset of source sites independently with probability q. For each source site j sampled, the transfer module 108 adds an edge with a cost of 1 between destination site i and the source site j. The item type for this edge is again sampled uniformly at random from item types available at the source site j and the quantity is sampled from an interval [1, 10]. Finally, for each source site j and for each type of available item at each source site j, the transfer module 108 sums requested items along its corresponding edges which makes an associated transfer instance feasible.

The ratios 504 are computed as a transfer cost of the solution determined using the described item transfer systems to the transfer cost of the exact solution. The ratios 506 are computed as the transfer cost of the solution determined using the described item transfer systems to the transfer cost of the conventional or "greedy" solution. As shown, the described systems consistently solve item transfer problems with integral solutions having transfer costs which are lower than transfer costs of the conventional or "greedy" solutions by 5 to 10 percent.

Figure 6:
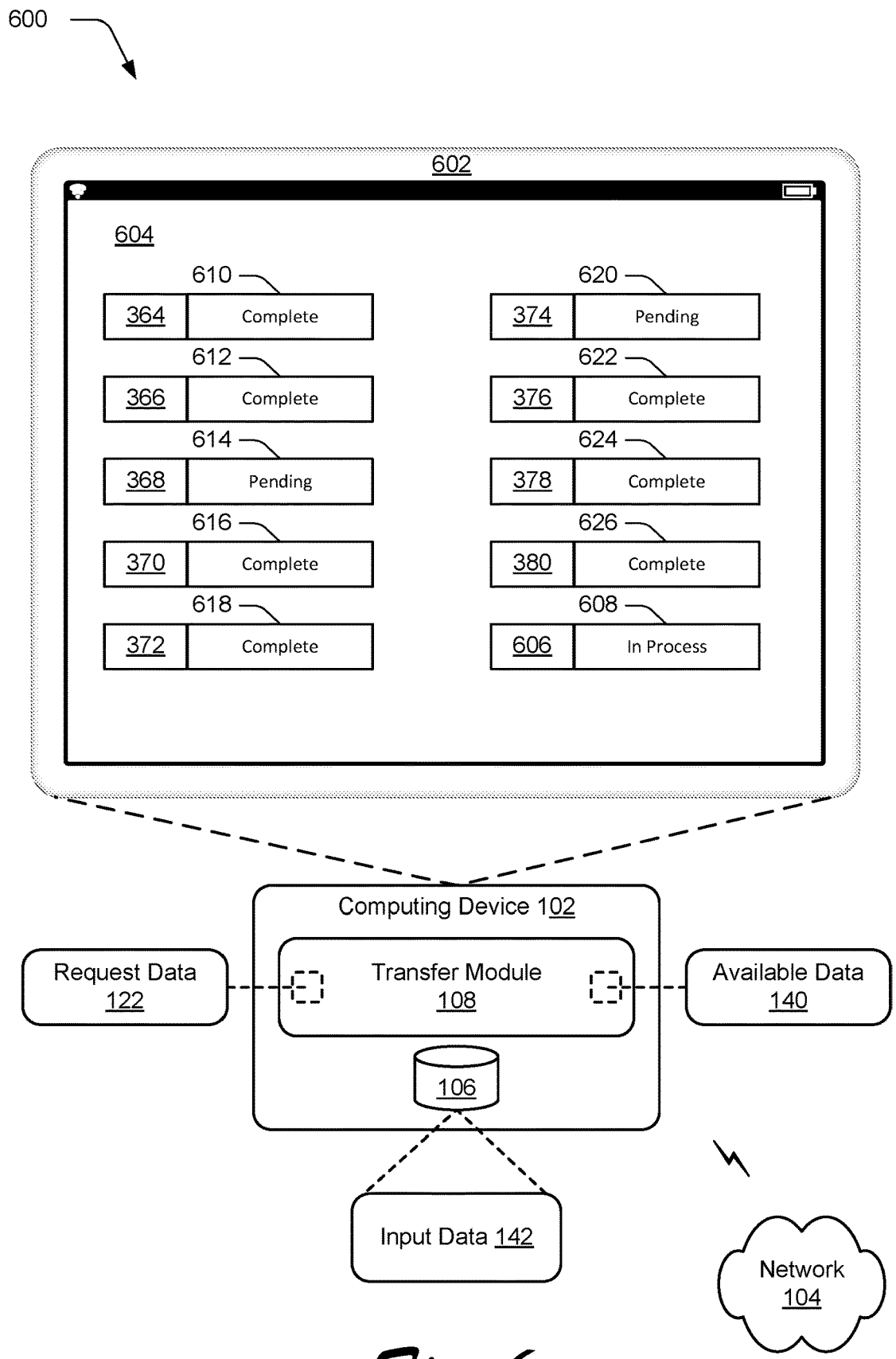
FIG. 6 illustrates an example user interface for causing and/or monitoring transferences of items to destination sites.

FIG. 6 illustrates an example 600 user interface for causing and/or monitoring transferences of items to destination sites. As shown, the example 100 includes a display device 602 that is communicatively coupled to the computing device 102 via a wired or a wireless connection. A variety of device configurations are usable to implement the computing device 102 and/or the display device 602. The display device 602 includes a user interface 604 and an indication of the integral approximate solution (x", y") 606 is displayed in the user interface 604.

In one example, a user interacts with an input device (e.g., a mouse, a keyboard, a stylus, a microphone, etc.) relative to the user interface 604 to interact with the indication of the integral approximate solution (x", y") 606. In this example, the transfer module 108 receives data describing the interaction with the indication of the integral approximate solution (x", y") 606. In response to receiving the data, the transfer module 108 causes transferences of the items requested by the destination sites 318-326 from the items available at the source sites 308-316 based on the integral approximate solution (x", y").

In the illustrated example, the shipment module 208 causes transferences of the items requested by the destination sites 318-326 from the items available at the source sites 308-316 automatically and without intervention by the user. In this example, the user interface 604 displays indications 608-626. Indication 608 is displayed relative to the indication of the integral approximate solution (x", y") 606, and the indication 608 visually communicates that the transferences of the items requested by the destination sites 318-326 are "In Process."

Indication 610 is displayed in the user interface 604 relative to an indication of the link 364. For instance, the indication 610 visually communicates that transference of one type A item, one type C item, and one type E item to the destination site 318 is "Complete." Indication 612 is displayed relative to an indication of the link 366, and the indication 612 visually communicates that transference of one type B item and two type E items to the destination site 318 is "Complete." Accordingly, the destination site 318 has received all of the items requested by the destination site 318.

Indication 614 is displayed relative to an indication of the link 368 to visually communicate that transference of four type D items to the destination site 320 is "Pending." Thus, the destination site 320 has not received all of the items requested by the destination site 320. As illustrated in FIG. 6, indication 616 is displayed relative to an indication of the link 370. The indication 616 visually communicates that transference of one type A item and one type E item to the destination site 322 is "Complete." Similarly, indication 618 is displayed relative to an indication of the link 372 to visually communicate that transference of one type B item to the destination site 322 is also "Complete." Accordingly, the destination site 322 has received all of the items requested by the destination site 322.

Indication 620 is displayed in the user interface 604 relative to an indication of the link 374 to visually communicate that transference of seven type C items to the destination site 324 is "Pending." Like the destination site 320, the destination site 324 has not received all of the items requested by the destination site 324. For example, indication 622 is displayed relative to an indication of the link 376 to visually communicate that transference of one type E item to the destination site 326 is "Complete."

Similarly, indication 624 is displayed in the user interface 604 relative to an indication of the link 378 to visually communicate that transference of one type A item, one type B item, and one type D item to the destination site 326 is also "Complete." Finally, indication 626 is displayed relative to an indication of the link 380. The indication 626 visually communicates that transference of one type B item and one type C item to the destination site 326 is "Complete." Accordingly, the destination site 326 has received all of the items requested by the destination site 326.

Example System and Device

Figure 7:
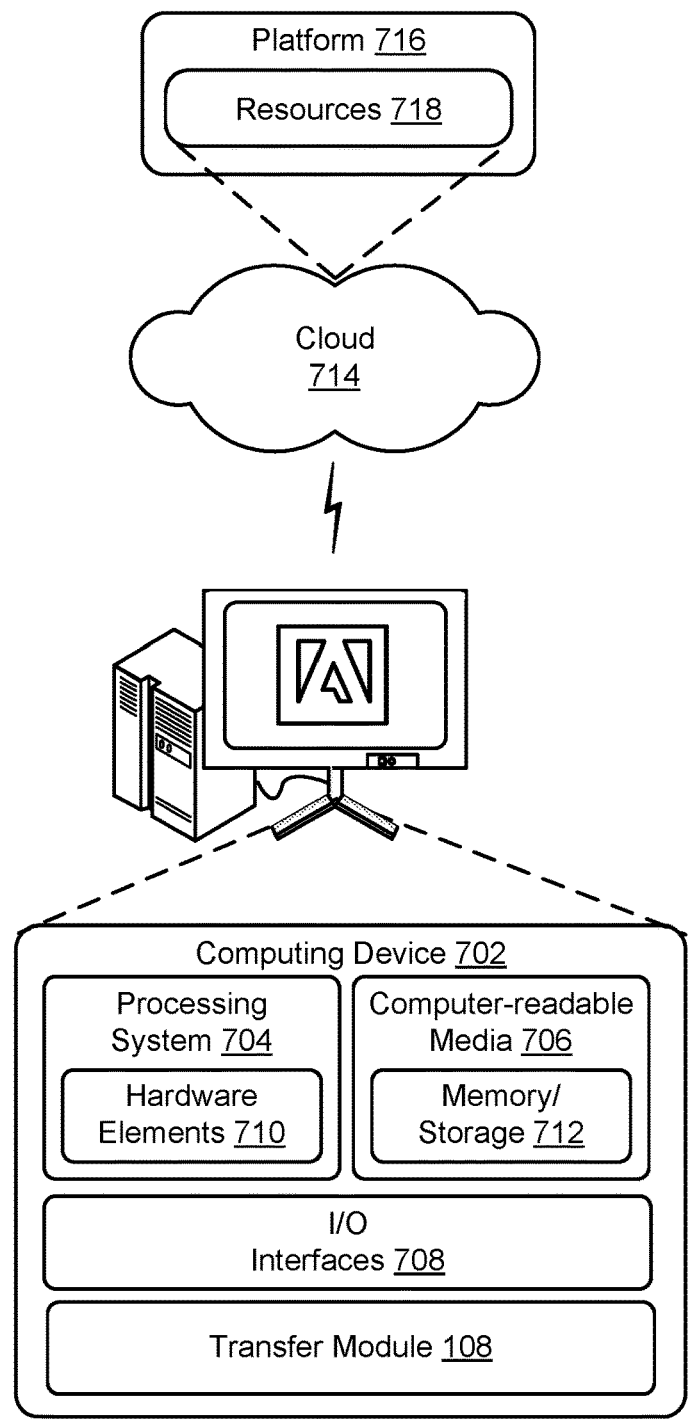
FIG. 7 illustrates an example system that includes an example computing device that is representative of one or more computing systems and/or devices for implementing the various techniques described herein.

FIG. 7 illustrates an example system 700 that includes an example computing device that is representative of one or more computing systems and/or devices that are usable to implement the various techniques described herein. This is illustrated through inclusion of the transfer module 108. The computing device 702 includes, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that are configured as processors, functional blocks, and so forth. This includes example implementations in hardware as an application specific integrated circuit or other logic device formed using one or more semiconductors. The hardware elements 710 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 706 is illustrated as including memory/storage 712. The memory/storage 712 represents memory/storage capacity associated with one or more computer-readable media. In one example, the memory/storage 712 includes volatile media (such as random access memory (RAM)) and/or nonvolatile media (such as read only memory (ROM), Flash memory, optical disks, magnetic disks, and so forth). In another example, the memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 710. For example, the computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supportable by various configurations of the computing device 702 and are not limited to the specific examples of the techniques described herein. This functionality is also implementable entirely or partially through use of a distributed system, such as over a "cloud" 714 as described below.

The cloud 714 includes and/or is representative of a platform 716 for resources 718. The platform 716 abstracts underlying functionality of hardware (e.g., servers) and software resources of the cloud 714. For example, the resources 718 include applications and/or data that are utilized while computer processing is executed on servers that are remote from the computing device 702. In some examples, the resources 718 also include services provided over the Internet and/or through a subscriber network, such as a cellular or Wi-Fi network.

The platform 716 abstracts the resources 718 and functions to connect the computing device 702 with other computing devices. In some examples, the platform 716 also serves to abstract scaling of resources to provide a corresponding level of scale to encountered demand for the resources that are implemented via the platform. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

Conclusion

Although implementations of item transfer control systems have been described in language specific to structural features and/or methods, it is to be understood that the appended claims are not necessarily limited to the specific features or methods described. Rather, the specific features and methods are disclosed as example implementations of item transfer control systems, and other equivalent features and methods are intended to be within the scope of the appended claims. Further, various different examples are described and it is to be appreciated that each described example is implementable independently or in connection with one or more other described examples.

What is claimed is:

1. A method comprising:
   receiving, by a processing device via a network, request data describing types of requested items and corresponding quantities of the types of requested items to receive at each of a plurality of destination sites;

detecting, by the processing device using a sensor system connected to the network, types of available items and corresponding quantities of the types of available items that are available at each of a plurality of source sites;

generating, by the processing device, a fractional solution that transfers the corresponding quantities of the types of requested items to each of the plurality of the destination sites from the corresponding quantities of the types of available items that are available at a subset of the plurality of the source sites;

generating, by the processing device, an integral approximate solution by conditionally sampling a distribution of the fractional solution, the integral approximate solution transfers the corresponding quantities of the types of requested items to each of the plurality of the destination sites; and causing, by the processing device, transferences of the corresponding quantities of the types of requested items to each of the plurality of the destination sites based on the integral approximate solution.

2. The method as described in claim 1, wherein conditionally sampling the distribution of the fractional solution includes identifying non-zero transfers and rounding the non-zero transfers to integral transfers.

3. The method as described in claim 1, wherein conditionally sampling the distribution of the fractional solution includes generating samples solutions and averaging the sampled solutions.

4. The method as described in claim 1, wherein the corresponding quantities of the types of requested items to receive at a particular destination site of the plurality of the destination sites are available at multiple source sites of the plurality of the source sites.

5. The method as described in claim 1, wherein the sensor system includes at least one of an image sensor, a pressure sensor, a tag reader, or a millimeter-wavelength radar system.

6. The method as described in claim 1, wherein the integral approximate solution transfers the corresponding quantities of the types of requested items to each of the plurality of the destination sites using a minimum number of established links between source sites of the plurality of the source sites and destination sites of the plurality of the destination sites.

7. The method as described in claim 1, wherein generating the integral approximate solution includes sampling a particular source node of a flow network, adding an edge between the particular source node and a particular destination node, and randomly sampling a quantity interval for a type of available item that is available at a particular source site corresponding to the particular source node.

8. The method as described in claim 7, wherein the quantity interval is [1, 10].

9. The method as described in claim 1, further comprising generating an approximate fractional solution based on the fractional solution that transfers the corresponding quantities of the types of requested items to each of the plurality of the destination sites from an additional subset of the plurality of the source sites.

10. The method as described in claim 9, wherein a particular group of source sites included in the subset is also included in the additional subset.

11. A system comprising:
a memory component; and
a processing device coupled to the memory component, the processing device to perform operations comprising:

receiving, via a network, request data describing types of requested items and corresponding quantities of the types of requested items to receive at each of a plurality of destination sites;

detecting, using a sensor system connected to the network, types of available items and corresponding quantities of the types of available items that are available at each of a plurality of source sites;

generating a fractional solution that transfers the corresponding quantities of the types of requested items to each of the plurality of the destination sites from the corresponding quantities of the types of available items that are available at a subset of the plurality of the source sites;

generating an integral approximate solution by conditionally sampling a distribution of the fractional solution, the integral approximate solution transfers the corresponding quantities of the types of requested items to each of the plurality of the destination sites; and generating an indication of the integral approximate solution for display in a user interface, the indication of the integral approximate solution usable to cause transferences of the corresponding quantities of the types of requested items to each of the plurality of the destination sites.

12. The system as described in claim 11, wherein the integral approximate solution transfers the corresponding quantities of the types of requested items to each of the plurality of the destination sites using a minimum number of established links between source sites of the plurality of the source sites and destination sites of the plurality of the destination sites.

13. The system as described in claim 11, wherein the corresponding quantities of the types of requested items to receive at a particular destination site of the plurality of the destination sites are available at multiple source sites of the plurality of the source sites.

14. The system as described in claim 11, wherein conditionally sampling the distribution of the fractional solution includes identifying non-zero transfers and rounding the non-zero transfers to integral transfers.

15. The system as described in claim 11, wherein conditionally sampling the distribution of the fractional solution includes generating samples solutions and averaging the sampled solutions.

16. A non-transitory computer-readable storage medium storing executable instructions, which when executed by a processing device, cause the processing device to perform operations comprising:

receiving, via a network, request data describing types of requested items and corresponding quantities of the types of requested items to receive at each of a plurality of destination sites;

detecting, using a sensor system connected to the network, types of available items and corresponding quantities of the types of available items that are available at each of a plurality of source sites;

generating a fractional solution that transfers the corresponding quantities of the types of requested items to each of the plurality of the destination sites from the corresponding quantities of the types of available items that are available at a subset of the plurality of the source sites;

generating an integral approximate solution by conditionally sampling a distribution of the fractional solution, the integral approximate solution transfers the corresponding quantities of the types of requested items to each of the plurality of the destination sites; and causing transferences of the corresponding quantities of the types of requested items to each of the plurality of the destination sites based on the integral approximate solution.

17. The non-transitory computer-readable storage medium as described in claim 16, wherein the operations further comprise generating an approximate fractional solution based on the fractional solution that transfers the corresponding quantities of the types of requested items to each of the plurality of the destination sites from an additional subset of the plurality of the source sites.

18. The non-transitory computer-readable storage medium as described in claim 17, wherein a particular group of source sites included in the subset is also included in the additional subset.

19. The non-transitory computer-readable storage medium as described in claim 16, wherein generating the integral approximate solution includes sampling a particular source node of a flow network, adding an edge between the particular source node and a particular destination node, and randomly sampling a quantity interval for a type of available item that is available at a particular source site corresponding to the particular source node.

20. The non-transitory computer-readable storage medium as described in claim 19, wherein the quantity interval is [1, 10].

* * * * *